(No Model.) 2 Sheets—Sheet 1.
T. J. HATCH.
ORE CONCENTRATOR.
No. 436,476. Patented Sept. 16, 1890.
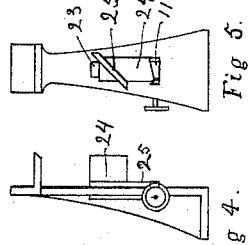
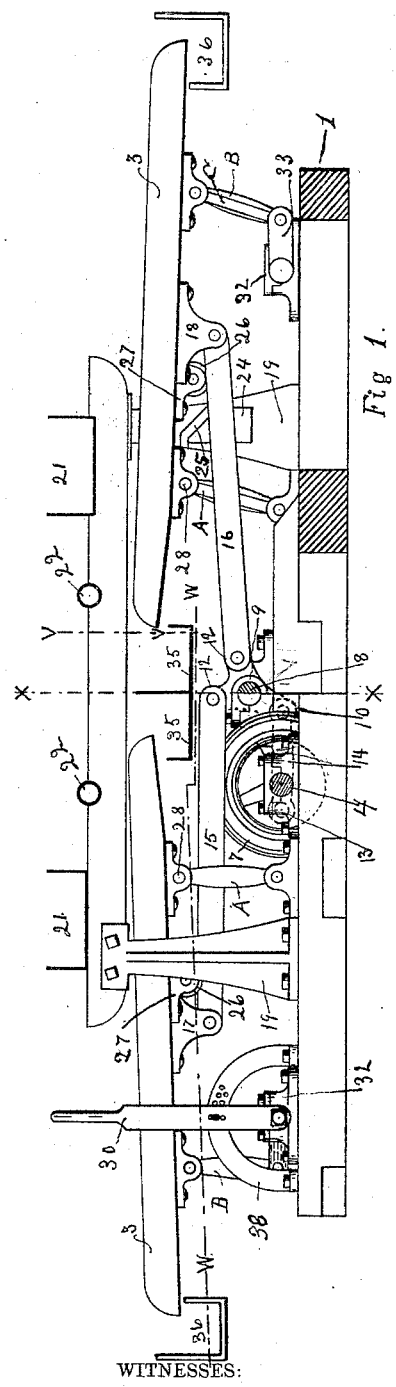
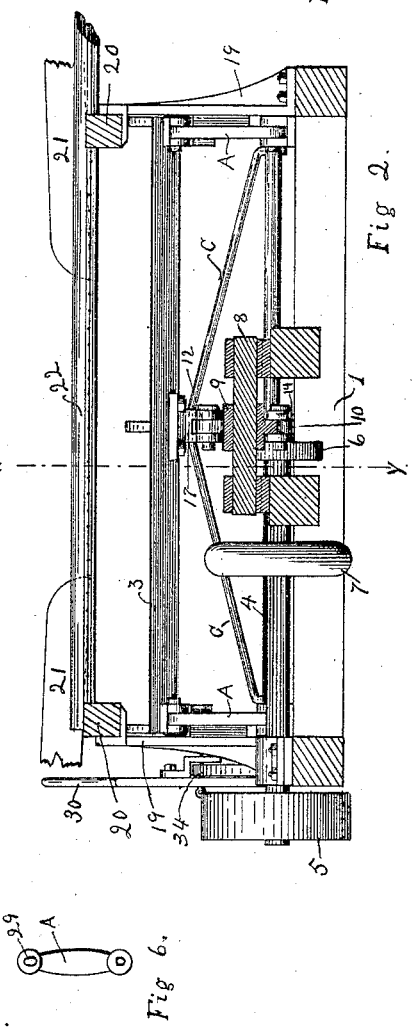
WITNESSES:
H. S. Smith
Wm. McConnell
INVENTOR
Thomas J. Hatch
BY
A. J. O'Brien
ATTORNEY

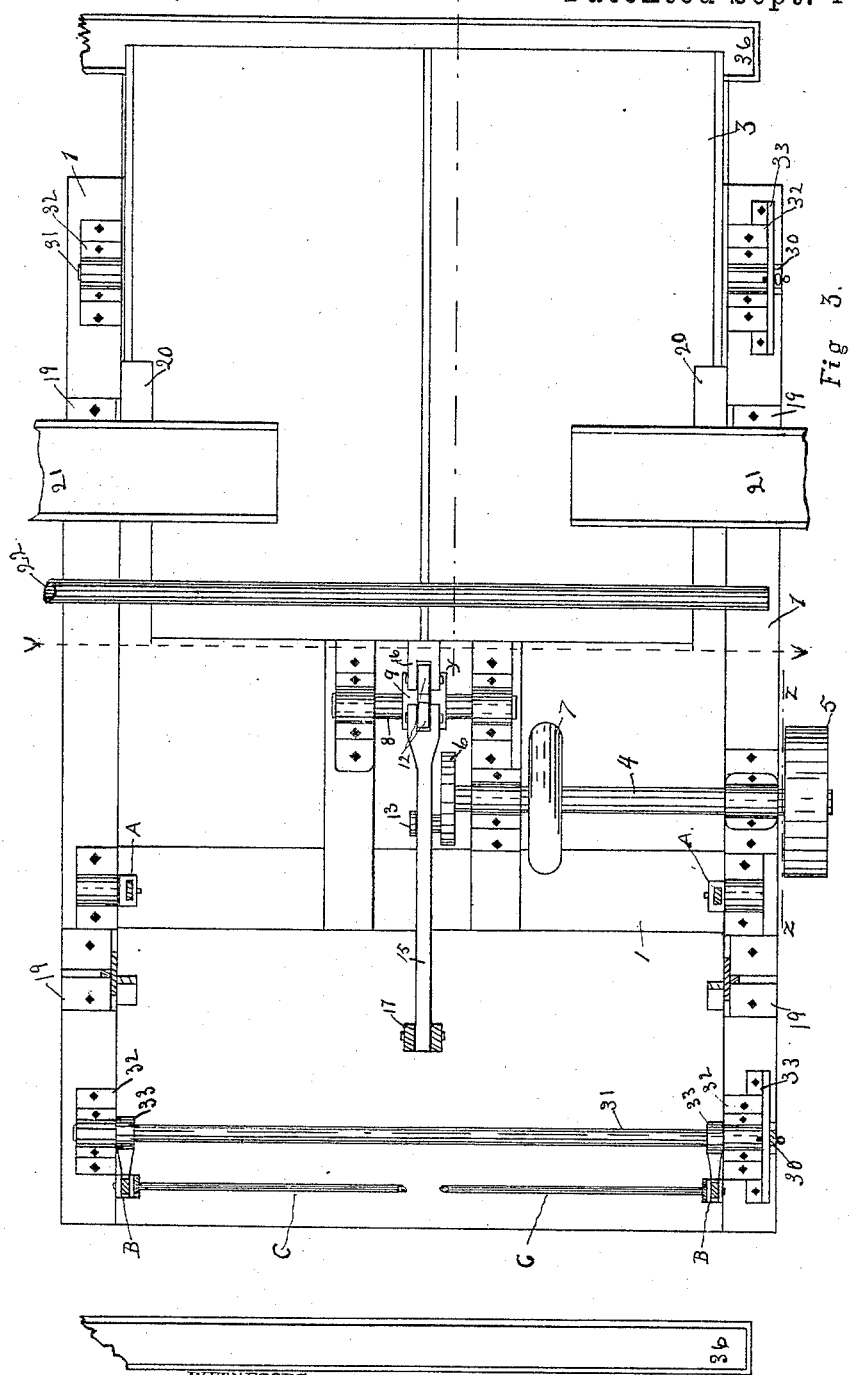

UNITED STATES PATENT OFFICE.

THOMAS J. HATCH, OF DENVER, COLORADO.

ORE-CONCENTRATOR.

SPECIFICATION forming part of Letters Patent No. 436,476, dated September 16, 1890.

Application filed October 9, 1889. Serial No. 326,531. (No model.)

*To all whom it may concern:*

Be it known that I, THOMAS J. HATCH, a citizen of the United States, residing at Denver, in the county of Arapahoe and State of Colorado, have invented certain new and useful Improvements in Ore-Concentrators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in ore-concentrators of the hydraulic class; and the object of my invention is to provide a machine of the class stated for separating the mineral from the rock and gangue with which it is found commingled in its natural state, said machine to be of simple and economical construction, durable, easily operated, reliable, and efficient, and at the same time possessing great capacity.

To these ends my invention consists of the features, arrangements, and combinations hereinafter described and claimed.

Figure 1 is a side view of the machine, partly in elevation and partly in section, the sectional portion on the right of the line $x\ x$ being taken on the line $y\ y$, Figs. 2 and 3, the portion of the view on the left of line $x\ x$ being taken through the line $z\ z$, Fig. 3. Fig. 2 is a transverse section taken on the line $x\ x$, Fig. 1, looking to the left. Fig. 3 is a top or plan view of the machine with the top portion removed on the left of line $x\ x$ down to the line $w\ w$, Fig. 1, to show the mechanism beneath. Figs. 4, 5, and 6 are detail views of parts of the mechanism.

In the drawings let the reference-numeral 1 indicate a suitable base or platform, to which are pivoted the lower extremities of the upright arms A and B, the upper extremities of the said arms being pivoted to the concentrating-tables 3 3. Each table 3 is supported by four of these upright arms—two on each side—said tables being adapted to swing back and forth upon these supports, as hereinafter described.

Suitably journaled upon the base 1 is the motor-shaft 4, provided with the pulley 5 on its outer extremity, the crank-wheel 6 on its inner extremity, and the fly-wheel 7 intermediate between wheels 5 and 6. Wheels 5, 6, and 7 are all made fast to and turn with their supporting-shaft.

8 is a short shaft centrally journaled upon suitable beams forming a part of the platform. Made fast to shaft 8 and adapted to turn therewith is a sort of hub 9. This hub is provided with the projecting lugs 10 12 12, each lug being provided with a suitable aperture adapting it for connection with other parts. To the wrist 13 of the crank-wheel 6 is pivoted one extremity of pitman 14, the opposite extremity of said pitman being pivoted to lug 10 of hub 9. To the lugs 12 12 of hub 9 are pivoted the inner extremities of the connecting-bars 15 and 16, respectively, the opposite extremities of these bars being pivoted to hangers 17 and 18, respectively, one of said hangers being suitably secured to the under side of the bottom of each table 3 3.

19 19 are standards—four in number—secured to the outer beams of the base 1 and made stationary thereon, there being one of said standards on each side of each table 3. Supported upon and suitably secured to the standards 19 are the two beams 20, one on each side of the machine and above the tables. To beams 20 are secured suitable hoppers or feed-spouts 21—four in number, or two for each table. Beams 20 also support the perforated water-pipes 22, which extend across the machine, as shown, and supply the tables with the necessary water for treating the material discharged upon them through the feed-spouts. Each standard 19 is provided with a slot or opening 23, within which slot is adjustably secured the block 24, having an inclined flange 25, the inclination of this flange being about forty-five degrees. Block 24 is constructed of two parts detachably secured together, so as to form grooved ways for the reception of the edges of the standard on each side of the slot 23. These ways retain the block securely within its standard, allowing it a free vertical movement.

11 is a wedge operated by a hand-screw for the purpose of adjusting block 24 within the slot 23. To the bottom of each table and on each side thereof is secured a casting 27, within which a small roller 26 is pivoted. Rollers 26 are so located that when tables 3 are near the limit of their movement toward the center of the machine the rollers come in contact with the inclined flanges 25, thereby giving a slight upward movement to the table. This upward movement is permitted by reason of the apertures 29 in the upper extremity of the supporting-arms A A being slightly elongated, as shown in Fig. 6. When in its normal condition, the gravity of the table holds the pivot 28 in the bottom of the aperture 29, thus allowing the movement of the table heretofore described.

It will be observed that the tables 3 3 stand in an inclined position, their inner extremities being the more elevated. This inclination of the tables is regulated by means of a lever 30, with which each table is provided. Each of these levers is rigidly secured to a shaft 31, which is of sufficient length to extend entirely across the machine, being allowed to turn freely within the boxes 32 made fast to the outer beams of the base 1.

Upon shaft 31 and just inside of the boxes 32 is rigidly secured on each side of the machine one extremity of a link 33, the other extremity of the link being hinged or pivoted to the lower extremity of one of the upright arms B and to the outer extremity of a brace C, the inner extremity of these braces being secured to a hanger centrally located on the under side of the bottom of the table. The hanger is not shown in the drawings, being located behind the other parts of the mechanism.

Levers 30 may be adjusted as desired, and are operated in connection with semicircular plates 38, provided with holes for the reception of a removable pin 34, which passes through a hole in the lever and enters a corresponding aperture in the plate 38. The means just described for adjusting the levers 30 is that shown in the drawings; but I do not limit myself to this means, since other means would answer as well. For instance, plate 38 might be notched upon its periphery for the reception of a vertical draw-rod secured to the lever and operated by a spring in the usual way.

35 35 are troughs for the reception of the mineral as it passes over the inner extremities of the tables.

36 36 are troughs for the reception of the gangue, waste material, or tailings discharged from the machine.

In the operation of my improved duplex concentrator the material to be treated is placed in troughs 21 and thence discharged to the tables 3 3, the necessary water at the same time being supplied to the tables by the perforated pipes 22. Pipes 22 are each provided with two longitudinal rows of perforations, one row being so located as to discharge water upon the tables 3, and the other so located as to discharge into the mineral-troughs 35. Power is now communicated to shaft 4 by means of a belt connecting pulley 5 with any suitable motor. As shaft 4 rotates a reciprocating movement is given to hub 9 by virtue of its connection with crank-wheel 6. This movement of hub 9 imparts a similar movement to tables 3, these tables moving backward and forward upon their supporting-arms A and B. As each table during each reciprocation nears the limit of its movement toward the center of the machine its pulley 26 comes in contact with the inclined flange 25, thereby giving the tables a slight upward movement. These two movements of the tables being repeated with any desired rapidity, separating the mineral from the gangue, the mineral, settling to the bottom of the tables and continually working upward, passes over the inner extremities of the tables into the troughs 35, the rock, gangue, and tailings passing over the lower extremities of the tables into troughs 36.

It will be observed that my improved machine might be single as well as duplex, the change from the duplex to the single form having no other effect except to diminish the capacity of the machine. In using a single table only one lug 12 on hub 9 is necessary.

It will also be observed that shaft 8 might be of any length desired and have any number of hubs 9, according to the number of tables it is desired to use, this number being limited only by the power available to operate the machinery. When the length of shaft 8 is increased and a plural number of hubs 9 used, these hubs may have either one or two lugs 12. If only one, then all the tables must be on the same side of shaft 8. If two lugs 12 are used, then the tables are on opposite sides of the shaft, as shown in Fig. 1.

It will also be observed that hub 9 might be of any length greater than that shown in the drawings, so as to form a sort of sleeve having lugs 12 thereon at suitable intervals, as desired.

Having thus described my invention, what I claim is—

1. In an ore-concentrator, the combination, with a suitable base, tables supported in an inclined position above the base, and upright arms A and B, hinged to the base at one extremity and to the tables at the opposite extremity, of a hub 9, provided with one or more lugs 12 and a lug 10, a short shaft 8, hub 9 being secured upon this shaft and adapted to rotate therewith, connecting-bars pivoted to lugs 12 at one extremity and to the concentrating-tables at the opposite extremity, suitable means of imparting a reciprocating motion to hub 9, the power being communicated by a pitman hinged at one extremity to lug 10 of the hub, standards 19, these standards being provided with adjustable blocks having inclined flanges on their inner surfaces, and means secured to the table and adapted to engage the inclined flanges and give an upward movement to the tables, substantially as described.

2. In an ore-concentrator, a suitable base, one or more concentrating-tables 3, upright arms A and B, pivoted to the base at one extremity and to the tables at the opposite extremity, the aperture for the reception of the pin in the upper extremity of arms A being somewhat elongated, each table being provided with a roller 26, standards 19 on each side of the tables, these standards being provided with adjustable blocks 24, having inclined flanges on their inner surfaces, the flanges being adapted to engage the rollers 26, and suitable means of imparting a reciprocating movement to the tables, substantially as described.

3. In an ore-concentrator, the combination of one or more tables 3, supported in an inclined position, upright supports A and B, hinged to the tables at one extremity, arms A being hinged to the base at the opposite extremity, means for adjusting the inclination of the tables, said means consisting of an upright lever 30 and a link 33, the lower extremity of the lever and one extremity of the link being made fast to a shaft 31, the other extremity of the link being hinged to the lower extremity of arm B, standards 19, these standards being provided with adjustable blocks having inclined flanges on their inner surfaces, means connected with the table adapted to engage the inclined flanges and give an upward movement to the table, and suitable means for giving a reciprocating movement to the table, substantially as described.

4. In a duplex ore-concentrator, the combination, with a suitable platform or base, of tables 3, upright arms A and B, pivoted to the base of the machine at one extremity and to the tables at the opposite extremity, the aperture through which arm A is pivoted to the table being somewhat elongated, standards 19, one on each side of each table, each of said standards being provided with an opening 23, blocks 24, adjustably secured in openings 23 of the standards, said blocks being each provided with an inclined flange 25, rollers 26, secured to the tables and adapted to engage the inclined flanges 25, a shaft 8, centrally journaled within the base of the machine, a hub 9, rigidly secured upon shaft 8, said hub being provided with lugs 10 and 12, connecting-bars 15 and 16, said bars being pivoted to lugs 12 at one extremity and to tables 3 at the opposite extremity, and a pitman-rod 14, pivoted to lug 10 at one extremity and to the wrist of a crank-wheel at the opposite extremity, said crank-wheel being rigidly secured upon a suitable motor-shaft, substantially as described.

5. In an ore-concentrator, the combination of a shaft 8, centrally journaled within the base of the machine, a hub 9, rigidly secured upon the shaft 8, said hub being provided with lugs 10 and 12, a pitman connected with lug 10, connecting-rods pivoted to lugs 12 at one extremity and to the concentrating-tables at the opposite extremity, table 3, supported above the base in an inclined position, upright supports A and B, standards 19, provided with adjustable blocks having inclined flanges 25 on their inner surfaces, rollers 26, secured to the tables and adapted to engage flanges 25, and means of adjusting the inclination of tables 3, said means consisting of a lever 30, a shaft 31, and a link 33, the lever and link having one extremity of each rigidly secured to the shaft, the other extremity of the link being hinged to the lower extremity of arm B, and suitable means of retaining lever 30 in any desired position, substantially as described.

In testimony whereof I affix my signature in presence of two witnesses.

THOMAS J. HATCH.

Witnesses:
 J. B. WILLSEA,
 WM. MCCONNELL.